(12) United States Patent
Ando et al.

(10) Patent No.: US 6,357,293 B1
(45) Date of Patent: Mar. 19, 2002

(54) AIR FLOW METER WITH HEAT GENERATING RESISTOR

(75) Inventors: Ryo Ando, Bolton (GB); Masuo Akamatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/343,245

(22) Filed: Jun. 30, 1999

(30) Foreign Application Priority Data

Jun. 30, 1998 (JP) .......................... 10-184533

(51) Int. Cl.[7] .............................................. G01F 3/24
(52) U.S. Cl. .................................................. 73/204.17
(58) Field of Search .......................... 73/202.5, 204.11, 73/204.13, 204.17, 204.15, 204.16, 204.23, 204.25, 204.27

(56) References Cited

U.S. PATENT DOCUMENTS

| | | | |
|---|---|---|---|
| 4,196,622 A | * | 4/1980 | Peter .......................... 73/118.2 |
| 5,036,702 A | * | 8/1991 | Akamatsu et al. ........ 73/204.15 |
| 5,181,420 A | * | 1/1993 | Suzuki et al. ............. 73/204.15 |
| 5,359,891 A | * | 11/1994 | Yamamoto et al. ....... 73/204.15 |
| 5,423,210 A | * | 6/1995 | Uchiyama ................ 73/204.15 |

FOREIGN PATENT DOCUMENTS

| | | |
|---|---|---|
| JP | 2-85724 | 3/1990 |

* cited by examiner

*Primary Examiner*—Max Noori
(74) *Attorney, Agent, or Firm*—Crowell & Moring LLP

(57) ABSTRACT

In a ratiometric output type air flow meter with a heat generating resistor, a ratiometric circuit is provided with a divider circuit which is constituted by invariable resistors and divides an external reference voltage Vref and a multiplier circuit. The invariable resistor is grounded, via the invariable resistor. To one of input terminals of the multiplier circuit an output signal V0 of an operational amplifier is inputted, to the other input terminal of the multiplier circuit voltage Vex divided by the invariable resistors is inputted, and the output signal Vout of the multiplier circuit is outputted to an engine control unit. A correction use resistor is connected at the junction of the invariable resistor and a current detection resistor, and is grounded via a ground wiring resistance. Thus the voltage drop Vg caused by the ground wiring is compensated by the correction use resistor, and the voltage (Vex−Vg) representing the input to the multiplier circuit is kept constant regardless to the magnitude of a heating current flowing through the heat generating resistor. Thereby, a ratiometric output and heat generating resistor type air flow meter which permits a highly accurate air flow rate measurement is realized without being affected by variation due to the heating current flowing through the heat generating resistor.

14 Claims, 3 Drawing Sheets

AIR FLOW METER WITH HEAT GENERATING RESISTOR

BACKGROUND OF THE INVENTION

This application claims the priority of Japanese application 10-184533, filed Jun. 30, 1998 in Japan, the disclosure of which is expressly incorporated by reference herein.

The present invention relates to an air flow rate measurement device used for control of an automobile engine.

An air flow meter with a heat generating resistor is one of the devices which detect intake air flow rate of an internal combustion engine. The air flow meter with a heat generating resistor is designed in such a manner that the heat generating resistor disposed in an air flow passage is heated up to a predetermined temperature and the intake air flow rate is detected based on a heating current supplied to the heat generating resistor.

An example of such air flow meters with a heat generating resistor is an intake air flow rate detecting device disclosed in JP-A-2-85724(1990). The known intake air flow rate detecting device is provided with a correction circuit, in other words a ratiometric circuit which corrects an output signal from an intake air flow rate detecting circuit depending on variation of a reference voltage supplied to an A/D converter circuit and outputs the same to the A/D converter circuit, and with the provision of the ratiometric circuit, an intake air flow rate detecting device is realized which permits an accurate intake air flow rate detection regardless of a possible variation of the reference voltage supplied to the A/D converter circuit.

However, in the known intake air flow rate detecting device when current flowing through the heat generating resistor increases, the voltage drop at the reference potential (GND) increases due to the wiring resistance, a ground potential Vg serving as a reference potential for the ratiometric circuit becomes higher than a ground potential Vgnd serving as a reference potential for an engine control unit (ECU), and the amplification rate of the ratiometric circuit decreases, thereby a problem is posed which causes errors and reduces accuracy in the output signal of the intake air flow rate detecting device.

FIG. 5 shows a schematic circuit diagram of the above explained conventional ratiometric output type air flow meter 50 with a heat generating resistor.

In FIG. 5, the collector of a transistor 60 is connected to a power source and the emitter thereof is grounded via a heat generating resistor 2 and a current detecting resistor 1. Numeral 5 denotes a wiring resistance between the current detecting resistor 1 and the ground. Further, the junction point between the heat generating resistor 2 and the current detecting resistor 1 is connected to a non-inverted input terminal of an operational amplifier 61, and an inverted input terminal of the operational amplifier 61 is connected to an output terminal thereof.

Still further, the output terminal of the operational amplifier 61 is connected to one of two input terminals of a multiplier circuit 11 in a ratiometric unit 10. The other input terminal of the multiplier circuit 11 is connected to the junction point between invariable resistors 3 and 4 connected in series with each other. The invariable resistor 3 is grounded via the invariable resistor 4 and the wiring resistance 5, and the invariable resistor 3 is supplied with an external reference voltage Vref for an engine control unit (ECU) 20. An output Vout of the multiplier circuit 11 is supplied to the ECU 20.

Although not illustrated in FIG. 5, a set of resistors is connected in parallel with the heat generating resistor 2 and the current detecting resistor 1 so as to constitute a bridge circuit. Therefore, when the bridge circuit imbalances due to increase in air flow rate, an output signal from an operational amplifier (not shown) for the bridge circuit, which is designed to sense such increase, is supplied to the base of the transistor 60 to supply a current to the heat generating resistor 2. In this instance, the larger the flow rate increase is, the supply current has to be increased accordingly; therefore, through the detection of output voltage V0 at the operation amplifier 61 which corresponds to the supply current, the air flow rate can be measured.

Now, when the grounding potential Vgnd for the ECU 20 in the device shown in FIG. 5 is used as the reference, because of the existence of the wiring resistance 5 between the ratiometric output type air flow meter 50 with a heat generating resistor and the ECU 20, when current Ia flowing through the heat generating resistor 2 increases, the reference grounding potential Vg of the ratiometric circuit 10 becomes higher than the reference grounding potential Vgnd.

The output voltage Vout of the ratiometric circuit 10 is expressed as follows, wherein it is assumed that the voltage proportional to the current flowing through the heat generating resistor 2 is V0, the proportion constant thereof is A and the external reference voltage for the circuit is Vref;

$$\text{Vout} = A \times V0 \times (\text{Vref} - \text{Vg}) \tag{1}$$

Because of the differences in the reference grounding potentials, an error Err is caused in the output voltage Vout as expressed by the following equation (2);

$$\text{Err} = -A \times V0 \times \text{Vg} \tag{2}$$

Since the reference ground potential Vg corresponds to a voltage drop Ia×R5 which is caused when the heating current Ia for the heating resistor 2 flows through the wiring resistance 5 (wherein the resistance value thereof is assumed as R5), and the heating current Ia is proportional to a voltage V2 detected by the current detection resistor 1, the reference ground potential Vg is proportional to V2×R5.

Further, since the air flow rate detection voltage V0 is also proportional to the heating current Ia and the heating current Ia is proportional to the voltage V2 and wherein it is assumed the proportion constant thereof is B, the equation (2) can be expressed by the following equation (3), wherein the error Err is expressed by a quadratic function of the voltage V2;

$$\text{Err} = -B \times (V2)^2 \times R5 \tag{3}$$

Even if the error Err expressed by the quadratic function of the voltage V2 is attempted to be adjusted by a characteristic adjusting means making use of a DC amplifier circuit, the correction of the error is difficult and the problem as referred to above is posed that the accuracy in the output signal of the air flow meter is reduced.

SUMMARY OF THE INVENTION

An object of the present invention is to provide a ratiometric output type air flow meter with a heat generating resistor which permits a highly accurate air flow rate measurement regardless of the variation in the ground potential caused by the current flowing through the heat generating resistor.

In order to achieve the above object, the ratiometric output type air flow meter with a heat generating resistor in which the heat generating resistor is disposed in an air flow passage and is supplied with a heating current to heat the same up to a predetermined temperature and which includes a ratiometric circuit converting an air flow rate signal V0 detected based on the heating current to a signal proportionated to an external reference voltage Vref and outputting the same, comprises a correction circuit which is designed to correct the conversion error through the ratiometric circuit which is caused by the heating current flowing through the wiring for grounding.

When the current flowing through the heat generating resistor increases, the reference potential drop due to the wiring resistance increases accordingly, thereby, the ground potential Vg serving as the reference potential for the ratiometric circuit becomes higher than the ground potential Vgnd serving as the reference potential for an engine control unit (ECU). Therefore, the amplification rate of the ratiometric circuit decreases, causing errors therein and reduced accuracy in output signals of the concerned air flow meter reduces.

Accordingly, when the conversion errors in the ratiometric circuit are corrected with the correction circuit, the accuracy reduction in the output signals of the air flow meter is prevented.

Preferably, in the above described ratiometric output type air flow meter with a heat generating resistor, the ratiometric circuit comprises a divider circuit which divides the external reference voltage Vref to obtain an input voltage Vex and a multiplier which receives the input voltage Vex and the air flow rate signal V0 as the input signals thereof and outputs an output signal Vout as the output of the ratiometric circuit, and the correction circuit is connected in series to the divider circuit at the side of the reference potential in the ground wiring of the air flow meter and includes a correction use resistor for correcting a voltage drop due to the heating current flowing through the ground wiring.

Further preferably, in the above described ratiometric output type air flow meter with a heat generating resistor the ratiometric circuit comprises a divider circuit which divides the external reference voltage Vref to obtain an input voltage Vex and a multiplier which receives the input voltage Vex and the air flow rate signal V0 as the input signals thereof and outputs an output signal Vout as the output of the ratiometric circuit. The correction circuit is connected between the division point in the divider circuit generating the voltage Vex and an input terminal of the multiplier where the air flow rate signal V0 is inputted and includes a correction use resistor for correcting a voltage drop due to the heating current flowing through the ground wiring.

Further preferably, in the above explained ratiometric output type air flow meter with a heat generating resistor, the ratiometric circuit comprises a divider circuit which divides the external reference voltage Vref to obtain an input voltage Vex and a multiplier which receives the input voltage Vex and the air flow rate signal V0 as the input signals thereof. The correction circuit is connected in series to the divider circuit at the side of the reference potential in the ground wiring of the air flow meter and includes a correction use variable resistor which can adjust a linearity of the output signals of the air flow meter by varying the resistance value thereof and an output characteristic adjusting circuit disposed at the output terminal of the ratiometric circuit and for adjusting the output characteristics of the air flow meter.

Further preferably, in the above described ratiometric output type air flow meter with a heat generating resistor, the ratiometric circuit comprises a divider circuit which divides the external reference voltage Vref to obtain an input voltage Vex and a multiplier which receives the input voltage Vex and the air flow rate signal V0 as the input signals thereof. The correction circuit is connected between the division point in the divider circuit generating the voltage Vex and an input terminal of the multiplier where the air flow rate signal V0 is inputted and includes a correction use variable resistor which can adjust a linearity of the output signals of the air flow meter by varying the resistance value thereof and an output characteristic adjusting circuit disposed at the output terminal of the ratiometric circuit and for adjusting the output characteristics of the air flow meter.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

The embodiments according to the present invention are explained with reference to the drawings.

Figure 1:
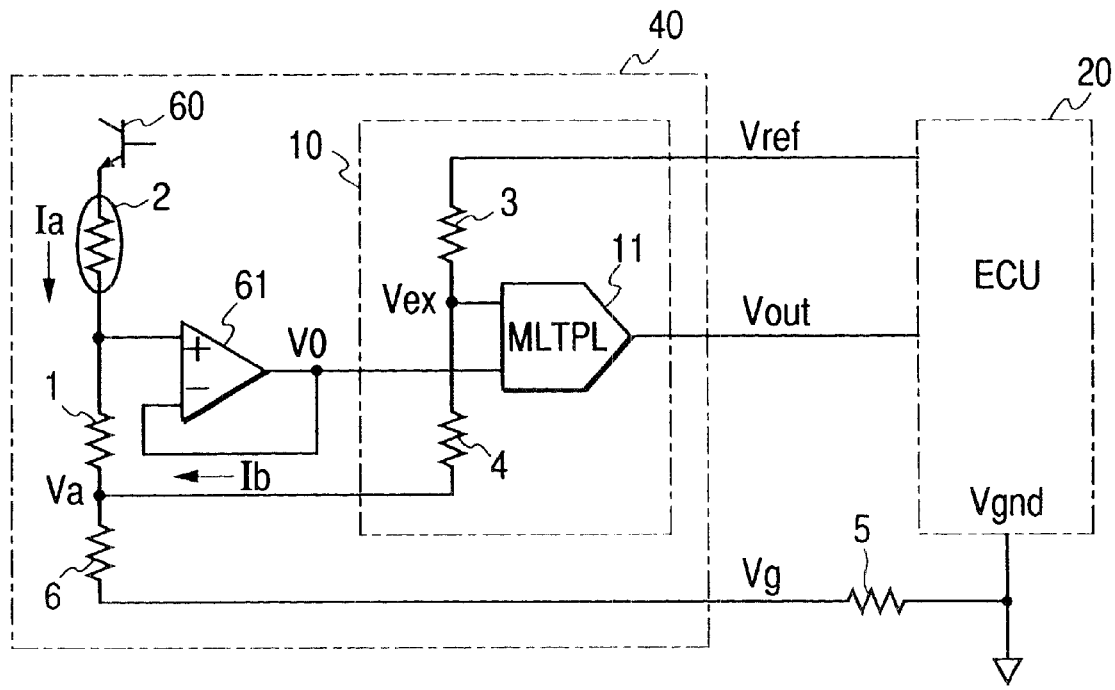
FIG. 1 is a schematic circuit diagram of a ratiometric output type air flow meter with a heat generating resistor representing a first embodiment according to the present invention.

FIG. 1 shows a ratiometric output and heat generating resistor type air flow meter 40. A basic difference of this air flow meter 40 from the conventional air flow meter 50 as shown in FIG. 5 is the provision of a correction circuit including a correction use resistor 6 disposed between the junction of a current detection resistor 1 and an invariable resistor 4 and a wiring resistance 5, but the other circuit structure of FIG. 1 embodiment is substantially the same as that of FIG. 5.

Figure 5:
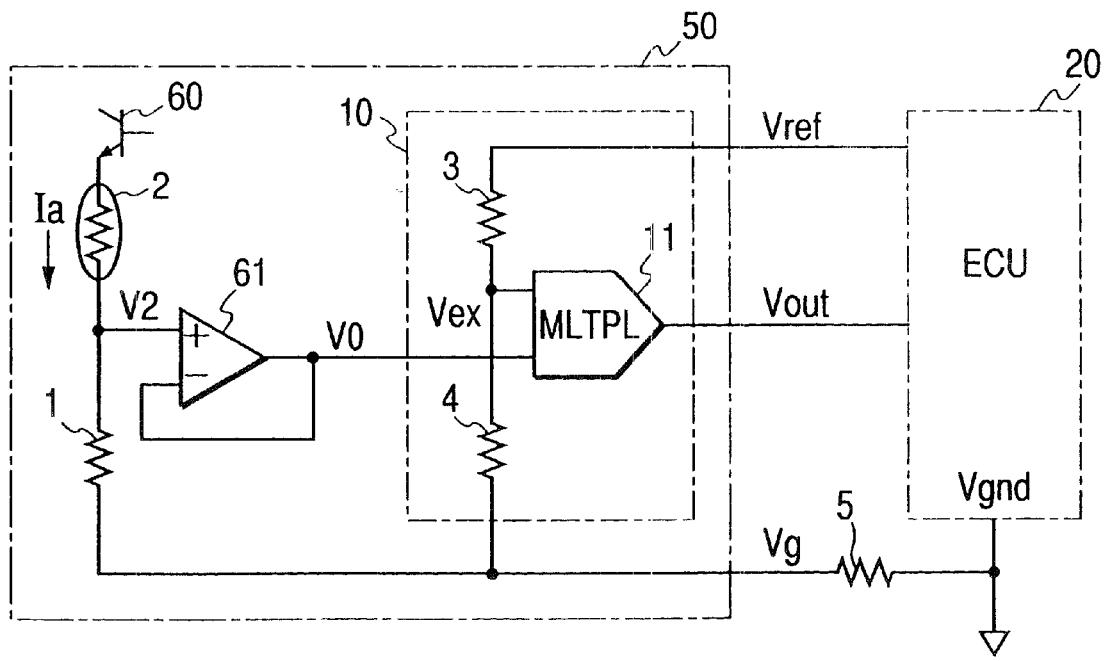
FIG. 5 is a schematic circuit diagram of the already described conventional ratiometric output type air flow meter with a heat generating resistor.

Namely, the ratiometric circuit 10 in FIGS. 1 and 5 is provided with the divider circuit which is constituted by the invariable resistors 3 and 4 connected in series each other and divides the external reference voltage Vref and the multiplier circuit 11. The invariable resistor 3 is grounded via the invariable resistor 4 and through the ground wiring.

To one of the input terminals of the multiplier circuit 11 is applied voltage V0 representing the voltage at the junction of the heat generating resistor 2 and the current detection use resistor 1 and appearing at the output signal of the operational amplifier 61 and to the other input terminal of the multiplier circuit 11 is applied voltage Vex divided by the invariable resistors 3 and 4, namely the voltage appearing at the junction of the invariable resistors 3 and 4. The output signal of the multiplier circuit 11 is outputted to the ECU 20 as the output signal Vout of the ratiometric circuit 10.

The correction use resistor 6 is connected at the side of the reference potential of the ground wiring, namely at the junction of the invariable resistor 4 and the current detection resistor 1, and is grounded with the ground wiring resistance 5. Thus, the voltage drop caused by the ground wiring is compensated by the correction use resistor 6.

Namely, in the first embodiment according to the present invention as shown in FIG. 1, with the provision of the correction circuit including the correction use resistor 6, the voltage (Vex−Vg) representing the input to the multiplier circuit 11 is kept constant regardless to the magnitude of the heating current Ia flowing through the heat generating resistor 2, which will be explained below.

When assuming that the potential between the current detection use resistor 1 and the correction use resistor 6 is Va, the current flowing through the invariable resistors 3 and 4 is Ib and the resistance values of the resistors 3, 4, 5 and 6 are respectively R3, R4, R5 and R6, the current Ib and the potential Va are respectively expressed by the following equations (4) and (5);

$$Ib=(Vref-Va)/(R3+R4) \qquad (4)$$

$$Va=(R5+R6)(Ia+Ib) \qquad (5)$$

From the above equations (4) and (5) the following equations (6) and (7) are derived.

$$Va=(R5+R6)\{Ia+(Vref-Va)/(R3+R4)\} \qquad (6)$$

$$Va=(R5+R6)\{(R3+R4)Ia+Vref\}/(R3+R4+R5+R6) \qquad (7)$$

When substituting Va expressed by the equation (7) for the equation (4), the following equation (8) is obtained $$Ib=Vref/(R3+R4)-\{1/(R3+R4)\}(R5+R6)\{(R3+R4)Ia+Vref\}/(R3+R4+R5+R6)=Vref/(R3+R4+R5+R6)-Vref(R5+R6)/(R3+R4+R5+R6) \qquad (8)$$

When calculating Vex−Vg by making use of Ib determined by the equation (8), the following equation (9) is obtained.

$$Vex-Vg=R4Ib+R6(Ia+Ib)=R6Ia+(R4+R6)Ib=R6Ia+(R6+R4)\{Vref/(R3+R4+R5+R6)-(R5+R6)Ia/(R3+R4+R5+R6)\}$$

$$=(R4+R6)Vref/(R3+R4+R5+R6)+\{R6(R3+R4+R5+R6)$$

$$-(R4+R6)(R5+R6)\}Ia/(R3+R4+R5+R6)=(R4+R6)Vref/(R3+R4+R5+R6)+(R6R3-R4R5)Ia/(R3+R4+R5+R6) \qquad (9)$$

Accordingly, in order to keep Vex−Vg constant regardless of the magnitude of the heating current Ia, it is necessary to satisfy the following equation (10);

$$R6R3-R4R5=0 \qquad (10)$$

Namely, if the resistance value R6 of the resistor 6 is selected to satisfy the following equation (11), the above condition expressed by the equation (10) is satisfied $$R6=R4R5/R3 \qquad (11)$$

As has been explained above, according to the first embodiment of the present invention, the correction use resistor 6 is connected between the junction of the invariable resistor 4 which is connected to the other input terminal of the multiplier circuit 11 in the ratiometric circuit 10 with the current detection use resistor 1 connected to the heat generating resistor 2 and the wiring resistance 5, and the resistance value R6 of the correction use resistor 6 is selected to be equal to (R4·R5/R3), consequently, the voltage value (Vex−Vg) representing one of the inputs for the multiplier circuit 11 is kept constant regardless to the magnitude of the heating current Ia. Thereby, a ratiometric output and heat generating resistor type air flow meter which permits a highly accurate air flow rate measurement is realized without being affected by variation of the ground potential due to the current flowing through the heat generating resistor 2.

In FIG. 1, the discrete correction use resistor 6 is connected to the ground wiring. However, alternatively the ground wiring can be elongated to increase the resistance of the ground wiring and to add the corresponding resistance value R6 to the original wiring resistance value.

Figure 2:
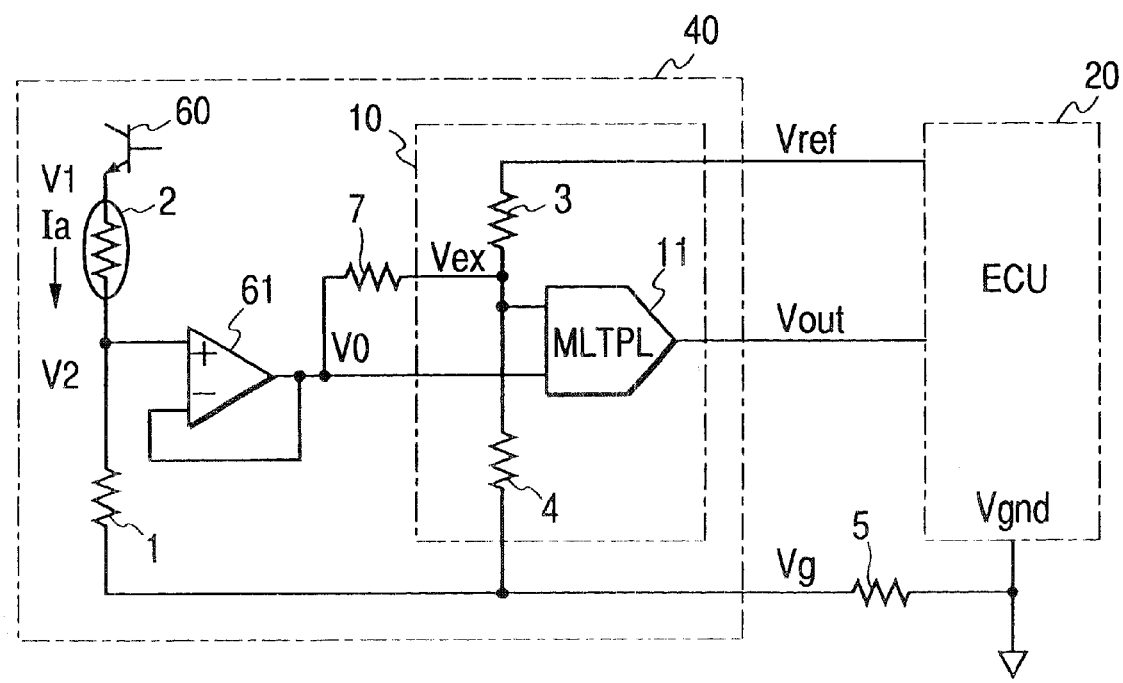
FIG. 2 is a schematic circuit diagram of a ratiometric output type air flow meter with a heat generating resistor representing a second embodiment according to the present invention.

FIG. 2 shows a ratiometric output and heat generating resistor type air flow meter 40 what is different from the conventional air flow meter 50 as shown in FIG. 5 by the provision of a correction circuit including a correction use resistor 7 disposed between the output terminal of the operational amplifier 61 and the junction of the invariable resistors 3 and 4. Otherwise, the structure of FIG. 2 is substantially the same as that of FIG. 5.

With the provision of the above correction use resistor 7, the voltage value (Vex−Vg) representing the input to the multiplier circuit 11 is kept constant regardless to the magnitude of the current flowing through the heat generating resistor 2, which will be explained hereinbelow.

When assuming that the resistance value of the correction use resistor 7 is R7, the currents flowing through the invariable resistors 3 and 4 and the resistor 7 are respectively as IR3, IR4 and IR7, the current IR4 is expressed by the following equation (12);

$$IR4=IR3+IR7 \qquad (12)$$

From the above equation (12) the following equation (13) is obtained;

$$(Vex-Vg)/R4=(V0-Vex)/R7+(Vref-Vex)/R3 \qquad (13)$$

From the above equation (13) the following equation (14) is obtained;

$$(1/R4+1/R7+1/R3)Vex=Vg/R4+V0/R7+Vref/R3 \qquad (14)$$

From the above equation (14) and the relationship Vg=R5·Ia, the following equation (15) is obtained;

$$Vex-Vg=(R5Ia/R4+V0/R7+Vref/R3)/(1/R4+1/R7+1/R3) -R5Ia \qquad (15)$$

Wherein, since V0=(R1+R5)·Ia, the following equation (16) is obtained;

$$Vex-Vg=\{Vref/R3+(R1+R5)Ia/R7+R5Ia/R7+R5Ia/R4\}/(1/R4+1/R7+1/R3)-(1/R4+1/R7+1/R3)R5Ia/(1/R4+1/R7+1/R3) =\{Vref/R3+(R1/R7-R5/R3)Ia\}/(1/R3+1/R4+1/R7\} \qquad (16)$$

Accordingly, in order to keep the voltage value Vex−Vg expressed by the above equation (16) constant regardless to the magnitude of the heating current Ia, it is necessary to satisfy the following equation (17);

$$R1/R7-R5/R3=0 \qquad (17)$$

Namely, if the resistance value R7 of the resistor 7 is selected to satisfy the following equation (18), the above condition expressed by the equation (17) is satisfied;

$$R7=R1R3/R5 \qquad (18)$$

As has been already explained, according to the second embodiment of the present invention, the correction use resistor 7 is connected between the junction of the invariable resistors 3 and 4 in the ratiometric circuit 10, namely at the voltage division point of the reference voltage Vref and the output of the operational amplifier 61, and the resistance value R7 of the correction use resistor 7 is selected to be equal to (R1·R3/R5). The voltage value (Vex−Vg) representing one of the inputs for the multiplier circuit 11 is kept constant regardless of the magnitude of the heating current Ia, and thereby, a ratiometric output and heat generating resistor type air flow meter which permits a highly accurate air flow rate measurement is realized without being affected by variation of the ground potential due to the current flowing through the heat generating resistor 2.

Further, in FIG. 2, since the resistance value of the correction use resistor 7 is large in comparison with that of the correction use resistor 6 in FIG. 1, the adjustment thereof is easy.

Figure 3:
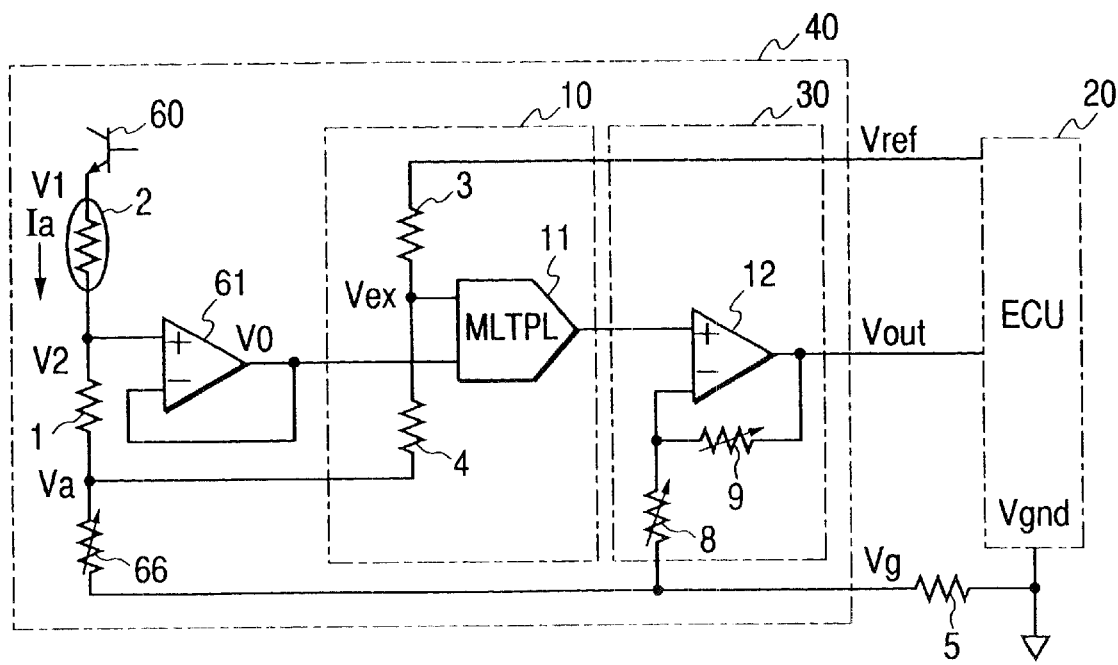
FIG. 3 is a schematic circuit diagram of a ratiometric output type air flow meter with a heat generating resistor representing a third embodiment according to the present invention.

FIG. 3 shows a ratiometric output and heat generating resistor type air flow meter 40 which is different from the conventional air flow meter 50 as shown in FIG. 5 by the provision of a correction circuit including a correction use variable resistor 66 disposed between the junction of a current detection resistor 1 and the invariable resistor 4 and the wiring resistance 5 as well as the provision of an output characteristic adjusting circuit disposed at the output terminal of the ratiometric circuit 10 structure of FIG. 3 is substantially the same as that of FIG. 5.

The output characteristic adjusting circuit 30 is constituted by an operational amplifier 12 and adjusting resistors 8 and 9, and to the non-inverting input terminal of the operational amplifier 12 is applied an output signal of the multiplier circuit 11. Further, the inverting input terminal of the operational amplifier 12 is connected to the junction between the variable resistor 66 and the wiring resistance 5 via the adjusting resistor 8. Still further, the junction between the inverting input terminal of the operational amplifier 12 and the adjusting resistor 8 is connected to the output terminal of the operational amplifier 12 via the adjusting resistor 9.

In this third embodiment, the dispersion in linearity of the air flow meter 40 due to characteristics of the heat generating resistor 2 and the wiring resistance 5 is corrected by making use of the variable resistor 66 which serves to adjust the output component in the multiplier circuit 11 determined by the term of second degree of the heating current Ia, however, through the adjustment of the variable resistor 66 the constant amplification rate of the air flow meter as a whole is lost, the output characteristic adjusting circuit 30 is introduced to ensure the amplification rate of the air flow meter constant.

Namely, with the variable resistor 66 the output linearity is adjusted so that (Vex−Vg) representing the input to the multiplier circuit 11 is kept constant without being affected by the magnitude of the heating current Ia, and with the adjusting resistors 8 and 9 the output slope is adjusted.

As has been previously explained, according to the third embodiment of the present invention, the correction use variable resistor 66 is connected between the junction of the invariable resistors 4 which is connected to the other input terminal of the multiplier circuit 11 in the ratiometric circuit 10, with the current detection use resistor 1 connected to the heat generating resistor 2 and the wiring resistance 5 as well as the output characteristic adjusting circuit 30 is disposed at the output terminal of the ratiometric circuit 10. The resistance value of the correction use variable resistor 66 is selected so that, the voltage value (Vex−Vg) representing one of the inputs for the multiplier circuit 11 is kept constant regardless of the magnitude of the heating current Ia, and the amplification rate is adjusted by the output characteristic adjusting circuit 30. Thereby, a ratiometric output and heat generating resistor type air flow meter which permits a highly accurate air flow rate measurement is realized without being affected by variation of the ground potential due to the current flowing through the heat generating resistor 2 and further without damaging the total output characteristic of the air flow meter.

Further, according to the third embodiment, since the output characteristics of the air flow meter can be adjusted by adjusting the output component thereof determined by the term of second degree of the heating current Ia, a further advantage can be obtained that even when such as passage configuration of the air flow meter and the combination thereof with the ECU are modified, the conversion characteristic for converting the output voltage from the air flow meter 40 to air flow rate which is stored in the ECU can be used without changes.

Figure 4:
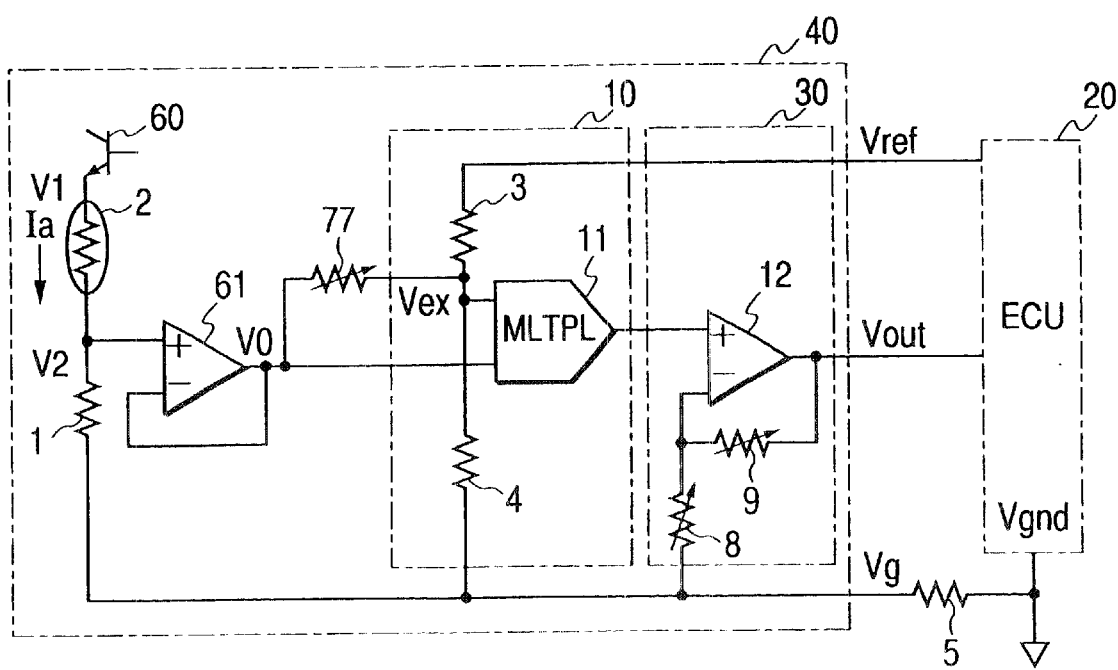
FIG. 4 is a schematic circuit diagram of a ratiometric output type air flow meter with a heat generating resistor representing a fourth embodiment according to the present invention.

FIG. 4 shows a ratiometric output and heat generating resistor type air flow meter which is different from the conventional air flow meter 50 shown in FIG. 5 by the provision of a correction circuit including a correction use variable resistor 77 disposed between the output terminal of the operational amplifier 61 and the junction of the invariable resistors 3 and 4 as well as the provision of the output characteristic adjusting circuit 30 disposed at the output terminal of the ratiometric circuit 10. Otherwise, the circuit structure of FIG. 4 embodiment is substantially the same as that of FIG. 5.

The output characteristic adjusting circuit 30 is constituted in the same manner as that shown in FIG. 3 and the adjusting resistor 8 is grounded via the wiring resistance 5.

In this fourth embodiment, with the variable resistor 77 the output curve characteristics is adjusted so that the voltage value (Vex−Vg) representing the input to the multiplier circuit 11 is kept constant without being affected by the magnitude of the heating current Ia. The output slope thereof is adjusted by the adjusting resistors 8 and 9 in the output characteristic adjusting circuit 30, while setting the outputs at the upper and lower control points constant by making use of the variable resistor 77 and the output characteristic adjusting circuit 30.

As has been explained above, according to the fourth embodiment of the present invention, since the correction use variable resistor 77 is connected between the output terminal of the operational amplifier 61 and the junction of the invariable resistors 3 and 4 as well as the output characteristic adjusting circuit 30 is disposed at the output terminal of the ratiometric circuit 10. The resistance value of the correction use variable resistor 77 is selected so that, the voltage value (Vex−Vg) representing one of the inputs for the multiplier circuit 11 is kept constant regardless of the magnitude of the heating current Ia, and the amplification rate is adjusted by the output characteristic adjusting circuit 30. Thereby, a ratiometric output and heat generating resistor type air flow meter which permits a highly accurate air flow rate measurement is realized without being affected by variation of the ground potential due to the current flowing through the heat generating resistor 2 and further without damaging the total output characteristic of the air flow meter.

As has been explained herein, with the present invention the following advantages are obtained.

Since the input signals to the multiplier circuit in the ratiometric circuit can be kept constant without being affected by the magnitude of the heating current, a ratiometric output and heat generating resistor type air flow meter which permits a highly accurate air flow rate measurement is thereby realized without being affected by variation of the ground potential due to the current flowing through the heat generating resistor.

Further, since the input signals to the multiplier circuit in the ratiometric circuit can be kept constant without being affected by the magnitude of the heating current, as well as the output characteristic adjusting circuit is disposed at the output terminal of the ratiometric circuit, a ratiometric output and heat generating resistor type air flow meter which permits a highly accurate air flow rate measurement is thereby realized without being affected by variation of the ground potential due to the current flowing through the heat generating resistor and further without damaging the total output characteristic of the air flow meter.

Still further, with the provision of the correction use variable resistor, the output characteristics of the air flow meter can be adjusted by adjusting the output component in the multiplier circuit determined by the term of second degree of the heating current. A further advantage can be obtained that even when such as passage configuration of the air flow meter and the combination thereof with the ECU are modified, the conversion characteristic for converting the output voltage from the air flow meter to air flow rate which is stored in the ECU can be used without changes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air flow meter, comprising a heat generating resistor disposed in an air flow passage and supplied with a heating current to heat the same up to a predetermined temperature, a ratiometric circuit converting an air flow rate signal V0 detected based on the heating current to a signal proportional to an external reference voltage Vref and outputting the same, and a correction circuit configured to correct a conversion error of said ratiometric circuit which is caused by the heating current flowing through a ground wiring.

2. An air flow meter according to claim 1, wherein said ratiometric circuit comprises a divider circuit which divides the external reference voltage Vref to obtain an input voltage Vex and a multiplier which receives the input voltage Vex and the air flow rate signal V0 as the input signals thereof and outputs an output signal Vout, and said correction circuit includes a correction use resistor which is connected in series to said divider circuit at a side of the reference potential in the ground wiring of the air flow meter and corrects a voltage drop due to the heating current flowing through the ground wiring.

3. An air flow meter according to claim 1, wherein said ratiometric circuit comprises a divider circuit which divides the external reference voltage Vref to obtain an input voltage Vex and a multiplier which receives the input voltage Vex and the air flow rate signal V0 as the input signals thereof and outputs an output signal Vout as the output of the ratiometric circuit, and the correction circuit includes a correction use resistor which is connected between the division point in the divider circuit generating the voltage Vex and an input terminal of the multiplier where the air flow rate signal V0 is inputted and corrects a voltage drop due to the heating current flowing through the ground wiring.

4. An air f low meter with a heat generating resistor according to claim 1, wherein said ratiometric circuit comprises a divider circuit which divides the external reference voltage Vref to obtain an input voltage Vex and a multiplier which receives the input voltage Vex and the air flow rate signal V0 as the input signals thereof, and said correction circuit includes a correction use variable resistor which is connected in series to the divider circuit at a side of the reference potential in the ground wiring of the air flow meter for permitting a linearity adjustment of the output signals of the air flow meter by varying the resistance value thereof and an output characteristic adjusting circuit disposed at the output terminal of said ratiometric circuit and outputting an output after adjusting the output characteristics of the air flow meter.

5. An air flow meter according to claim 1, wherein said ratiometric circuit comprises a divider circuit which divides the reference voltage Vref to obtain an input voltage Vex and a multiplier which receives the input voltage Vex and the air flow rate signal V0 as the input signals thereof, and said correction circuit includes a correction use variable resistor which is connected between a division point in said divider circuit generating the voltage Vex and an input terminal of said multiplier where air flow the rate signal V0 is inputted for permitting a linearity adjustment of the output signals of the air flow meter by varying the resistance value thereof and an output characteristic adjusting circuit disposed at the output terminal of said ratiometric circuit and outputting an output after adjusting the output characteristics of the air flow meter.

6. An air flow meter comprising:
   a heat generating resistor disposed in an air flow passage and arranged to be supplied with a heating current to maintain a predetermined temperature;
   a current detection resistor for detecting the heating current flowing through said heat generating resistor, said current detection resistor being connected in series with said heat generating resistor downstream thereof;
   a first operational amplifier of which a non-inverting input terminal is connected to the junction between said heat generating resistor and said current detection resistor and of which an inverting input terminal is connected to the output terminal thereof, whereby said first operational amplifier outputs an amplified output signal voltage V0 corresponding to the heating current and representing a flow rate of air flowing through the air flow passage;
   a ratiometric circuit including a multiplier circuit and a series circuit of a first invariable resistor disposed upstream and a second invariable resistor disposed downstream, said series circuit of the first and second invariable resistors being connected between an external reference voltage Vref and a ground wiring, the junction between first and second invariable resistors of said series circuit being connected to one of two terminals of said multiplier circuit and the other terminal thereof being connected to the output terminal of said first operational amplifier outputting the amplified output signal voltage V0; and
   a correction circuit being coupled to said ratiometric circuit, said correction circuit compensates conversion errors introduced in said ratiometric circuit due to variation in voltage drop across the ground wiring caused by the heating current flowing therethrough.

7. An air flow meter according to claim 6, wherein said correction circuit includes a third resistor connected to the ground wiring downstream of the second invariable resistor in said series circuit.

8. An air flow meter according to claim 6, wherein said correction circuit includes a third resistor connected between the two input terminals of said multiplier circuit.

9. An air flow meter according to claim 7, further comprising an output characteristic adjusting circuit including a second operational amplifier of which non-inverting input terminal is connected to the output terminal of said multiplier circuit, and inverting input terminal is connected to the ground wiring through a first variable adjusting resistor and is connected to the output terminal thereof through a second variable adjusting resistor, wherein said third resistor is a variable resistor.

10. An air flow meter according to claim 8, further comprising an output characteristic adjusting circuit including a second operational amplifier of which non-inverting input terminal is connected to the output terminal of said multiplier circuits and of which inverting input terminal is connected to the ground wiring through a first variable adjusting resistor and is connected to the output terminal thereof through a second variable adjusting resistor, wherein said third resistor is a variable resistor.

11. An air flow meter comprising:

a heat generating resistor;

an operational amplifier;

a first resistor;

a second resistor;

a third resistor; and a multiplier circuit, the air flow meter further comprising:

said second resistor being connected to a reference voltage (Vref) through said first resistor, said heat generating resistor being connected to a non-inverting input terminal of said operational amplifier and the output terminal thereof being connected to an inverting input terminal, the output terminal of said operational amplifier being connected to an input terminal of said multiplier circuit and a junction of said first resistor and said second resistor being connected to another input terminal of said operational amplifier, said third resistor being provided between a junction point of said second resistor and said heat generating resistor and one of terminals of a grounding wire of which other terminal being grounded, and the resistance value of said third resistor being determined to be substantially equal to the resistance value of said second resistor multiplied by the resistance value of said grounding wire and divided by the resistance value of said first resistor.

12. An air flow meter according to claim 11, further comprising an amplification rate adjusting circuit disposed at the output terminal of said multiplier circuit, wherein said third resistor is a variable resistor.

13. An air flow meter comprising:

a heat generating resistor;

an operational amplifier;

a first resistor;

a second resistor;

a third resistor; and a multiplier circuit, the air flow meter further comprising:

a non-inverting input terminal of said operational amplifier being connected to said heat generating resistor and an inverting input terminal of said operational amplifier being connected to the output terminal thereof, to one of input terminals of said multiplier circuit the output terminal of said operational amplifier is connected and to the other input terminal of which is connected to a reference voltage (Vref) through said first resistor and further is grounded by a grounding wire, said heat generating resistor being connected to said grounding wire through said second resistor, the output terminal of said operational amplifier being connected to the other input terminal of said multiplier circuit through said third resistor, and the resistance value of said third resistor being determined to be substantially equal to the resistance value of said second resistor multiplied by the resistance value of said first resistor and divided by the resistance value of said grounding wire.

14. An air flow meter according to claim 13, further comprising an amplification rate adjusting circuit disposed at the output terminal of said multiplier circuit, wherein said third resistor is a variable resistor.

* * * * *